(12) United States Patent
Moreton

(10) Patent No.: US 7,376,111 B2
(45) Date of Patent: May 20, 2008

(54) TERMINATING FRAME RECEPTION

(75) Inventor: Michael John Vidion Moreton, Wiltshire (GB)

(73) Assignee: Synad Technologies Limited, Reading, Berkshire (GB)

( * ) Notice: Subject to any disclaimer, the term of this patent is extended or adjusted under 35 U.S.C. 154(b) by 851 days.

(21) Appl. No.: 10/729,680

(22) Filed: Dec. 4, 2003

(65) Prior Publication Data
US 2004/0170194 A1 Sep. 2, 2004

(30) Foreign Application Priority Data
Dec. 5, 2002 (GB) ................ 0228396.8

(51) Int. Cl.
*H04Q 7/24* (2006.01)

(52) U.S. Cl. ............. 370/338; 370/311; 370/474; 370/908

(58) Field of Classification Search ........... 370/252, 370/254, 311, 338, 389, 395.1, 470, 471, 370/474, 475, 908; 455/343.3, 574, 41.1, 455/41.2
See application file for complete search history.

(56) References Cited

U.S. PATENT DOCUMENTS

| 5,673,259 | A | * | 9/1997 | Quick, Jr. ................. 370/342 |
| 5,696,899 | A | * | 12/1997 | Kalwitz ................... 370/908 |
| 5,905,965 | A | * | 5/1999 | Asano et al. ............. 455/574 |
| 6,031,466 | A | * | 2/2000 | Leshets et al. ........... 370/313 |
| 6,044,069 | A | * | 3/2000 | Wan ....................... 370/311 |
| 6,693,888 | B2 | * | 2/2004 | Cafarelli et al. .......... 370/338 |
| 7,054,296 | B1 | * | 5/2006 | Sorrells et al. .......... 370/338 |

\* cited by examiner

*Primary Examiner*—Quochien B. Vuong
(74) *Attorney, Agent, or Firm*—Blakely, Sokoloff, Taylor & Zafman; Stephen M. De Klerk

(57) ABSTRACT

A method and apparatus for terminating frame reception in a wireless Local Area Network. A node receiving a frame transmitted on the common channel in a wireless Local Area Network determines the destination address of the frame. If the destination address indicates that the transmitted frame is not intended for that node, the node terminates reception of the frame for a time period at least as long as the time required to transmit the remainder of the transmitted frame. In a further embodiment, the time period can also include at least one Short Inter Frame Space and the time required to send an Acknowledgement frame.

15 Claims, 1 Drawing Sheet

TERMINATING FRAME RECEPTION

CROSS-REFERENCE TO OTHER APPLICATIONS

This Application claims priority from Great Britain Patent Application No. 0228396.8, filed on Dec. 5, 2002.

FIELD OF THE INVENTION

The present invention relates to wireless Local Area Networks (WLANs) and in particular to a method of processing a data frame at a node in a wireless Local Area Network.

BACKGROUND OF THE INVENTION

Wireless networks, as standardised by the Institute of Electrical and Electronics Engineers (IEEE) in their document 802.11, consist of a number of nodes that transmit units of data called frames on a shared radio channel. Only one node can transmit at once and the allocation of the channel to an individual node, so that it can transmit a frame, is handled by an algorithm specified by the standard.

Each frame consists of header information, optionally followed in time by a payload. The payload is the data which the network was designed to transport from node to node. The header contains the frame type (which describes the frame's role in the protocol), information about the length of the frame, an address field that identifies the intended recipient(s) of the frame and other information required for the correct operation of the protocol.

Stations in an IEEE 802.11 wireless network have hardware for the transmission and reception of the radio signals specified by the standard. This hardware can, in general, only be used on a single radio channel at once. In addition, most hardware of this type has the facility to be switched off when not in use, in a process substantially reducing the power consumption. As wireless LANs are often used in battery powered devices, any mechanism for reducing power consumption is extremely desirable.

It is accordingly an object of the present invention to address such power consumption issues.

SUMMARY OF THE INVENTION

In accordance with the present invention there is provided a method of processing a data frame at a node in a wireless Local Area Network, the method comprising receiving a first part of a transmitted frame, identifying within that first part of the transmitted frame, a frame destination address and terminating reception of a second part of the transmitted frame when it is determined that the frame destination address indicates that the transmitted frame is not intended for that node.

There is also provided a wireless Local Area Network access node comprising a receiver adapted to receive a first part of a transmitted frame within the wireless Local Area Network, a processor means configured to detect the frame destination address from the first part of the transmitted frame, and terminate reception of the second part of the frame when it is determined that the frame destination address indicates that the transmitted frame is not intended for that node.

In some embodiments the frame destination address may indicate an individual node. In additional or alternative embodiments the frame destination address may indicate all nodes or a group of nodes.

A technique is accordingly proposed by which a node can determine at an early stage that the rest of the frame is of no interest to it. This frees a period of time during which the receiver hardware can either be placed into a low power consumption mode, or during which it could be used for other purposes. Examples of such other purposes include scanning alternative radio channels for alternative wireless networks that the node might wish to use at some later point, and detecting the presence of other users of the radio channel, such as radar.

IEEE 802.11 already includes a mechanism for nodes to enter a power saving state. While in this state, the node will neither transmit nor receive frames, and other nodes in the network will store frames intended for that node until it wakes up from the power saving state.

The amount of co-ordination required between the nodes in the network to achieve this means that it works on a fairly coarse granularity (of the order of 100 milliseconds). This means that performance of the network connection will be disrupted for the node in question. Higher level protocols that are encapsulated inside the frames (such as TCP/IP) may react badly to the stop/start nature of the link, potentially reducing the overall performance even further. As a result the standard power saving state should only be used at times when the traffic requirements of the node in question are extremely low, or the reduction in performance is unlikely to be noticeable to the user of the device.

In contrast, the mechanism described below does not require any cooperation from other nodes in the network, and does not disrupt the normal flow of frames in any way. The only time used is time that would normally be wasted in the reception of data that would immediately be discarded.

In a particularly preferred embodiment, the first part of the transmitted frame further includes a transmission duration indicator which indicates the expected duration of exchange of information related to the transmitted frame, after the transmission thereof. In that case, preferably, the method further comprises terminating reception of the said second part of the transmitted frame only when the transmission duration indicator indicates that the said expected duration of transmission is less than a predetermined threshold.

Further preferred features are set out in the dependent claims appended hereto.

According to a still further aspect of the invention, there is provided a method of processing a data frame at a node in a wireless Local Area Network, the method comprising:

receiving a first part of a transmitted frame;

identifying, within that first part of the transmitted frame, a frame destination address;

identifying, within the first part of the transmitted frame, a duration field, indicative of an expected duration of exchange of information related to the transmitted frame, after the transmission thereof; and, terminating reception of a second part of the transmitted frame when it is determined that the frame destination address indicates that the transmitted frame is not intended for that node and the duration field indicates the duration of exchange of information is less than a predetermined time.

It will be understood by those skilled in the art that the dependent claims could equally be applied to this aspect as well.

BRIEF DESCRIPTION OF THE DRAWINGS

The present invention may be put into practise in a number of ways, and some embodiments will now be described by way of example only and with reference to the accompanying drawings, in which.

DETAILED DESCRIPTION OF PREFERRED EMBODIMENTS

Figure 1:
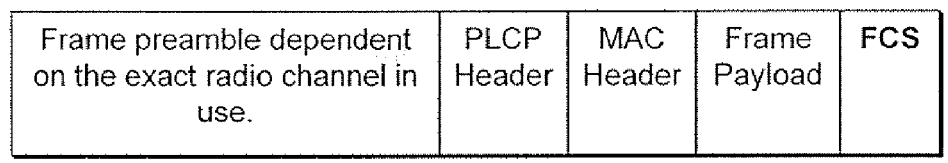
FIG. 1 shows a schematic diagram illustrating the constituent parts of a typical transmitted frame in a wireless Local Area Network.

The generalised format of an IEEE 802.11 frame is shown in FIG. 1. Elements of the frame are transmitted one after the other (in time) starting at the left of the frame, and continuing (without break) to the right.

The elements of the frame that are useful in this invention are:

The Physical Layer Convergence Procedure (PLCP) header which contains the PLCP Length field, and can be used to determine the period of time until the end of the frame; the MAC header, which contains the frame destination address, a frame duration field, which indicates the expected time to complete frame exchange after transmission of the present frame, as well as the frame type, and the frame type; and the Frame Check Sequence (FCS), which allows the receiving node to discard frames that have been corrupted by interference.

If the destination address field in the MAC header does not specify the receiving node, then the receiving node knows that the payload (if any) is of no interest to it. Furthermore, it also knows that the FCS will not be of interest to it either, as all it can indicate is another reason for ignoring the rest of the frame.

Hence the node knows that there will be a period of time (that can be calculated from the PLCP header length field) during which the radio medium will be busy with data that is of no interest to this node. It can use this period of time to perform other tasks such as:

(a) entering a low power consumption mode,
(b) tuning to a different radio channel and looking for other wireless LANs that it might want to connect to at some later point,
(c) or performing checks for other users of the current channel, such as the radar detection checks required in some regulatory domains.

However, as a condition to accessing the medium, the MAC Layer in a node must first check the value of its Network Allocation Vector (NAV), which is a counter resident at each node that represents the amount of time that the post-frame information exchange for the previous frame will take to send. The NAV counter must be zero before that node is allowed to access the shared medium and attempt to send a frame. In this way, collisions are avoided.

Prior to transmitting a frame, a node calculates the expected time to complete frame exchange after transmission of the present frame. For example, following a "normal" data frame, there is a Short Inter Frame Space (SIFS), and then an ACK frame is sent which requests acknowledgement of receipt of the data frame preceding that ACK frame. The node then places a value representing this time in the duration field of the MAC header. For a broadcast frame, the duration field is thus zero, since broadcast frames are not acknowledged. When stations receive a data frame with a header, they examine this duration field value and use it as the basis for setting their corresponding NAVs.

The duration field can indicate that the post data frame information exchange for the frame to be sent will take a relatively long time or only a short time. However, in some cases, the duration field can be corrupted from being a short value to being a long value instead. The receiving node can only tell the duration field has been corrupted if the whole frame is received and the checksum is invalid.

To ensure that the node will not remain idle for a period longer than required, in a further enhancement, the node will only use the duration field if it indicates that the post data frame information exchange period will be small. If the duration field indicates a large value, (for example, a time greater than a SIFS plus an ACK frame) then the node will automatically continue to receive the whole of the frame including the FCS to check the duration field is valid, then set the NAV and node idle time accordingly.

Figure 2:
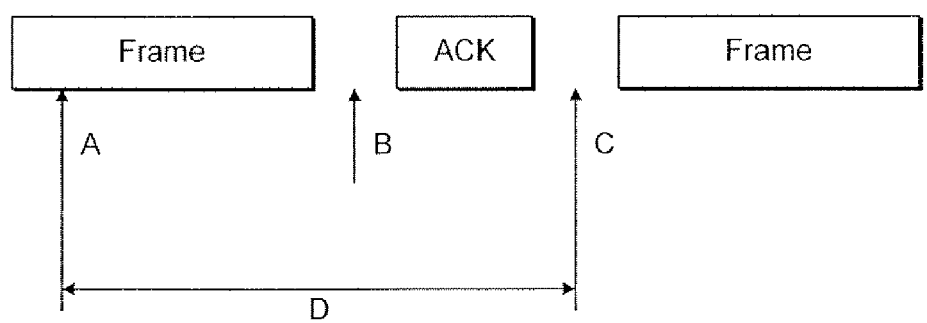
FIG. 2 shows, again schematically, a pair of the frames in FIG. 1, separated by an acknowledgement frame and some time gaps.

An even further enhancement is possible and is described in FIG. 2. The protocol defines that after transmission of a frame with a payload there will be a short delay (B) (the SIFS mentioned above), followed by transmission of an ACK frame, followed by another short period (C), which will be at least as long as a SIFS. As the time taken to transmit the ACK frame can be calculated, the time period during which this node can be idle (D), and therefore ignore frames on the channel, is extended by an additional period of 2×SIFS plus the time to send the ACK.

The major advantage of this invention is that it can be used even during periods of relatively heavy traffic on the radio channel, and is invisible to transported protocols, and hence the user. Moreover, the present invention is applicable to ad hoc mode and infrastructure modes of wireless network communications.

Whilst embodiments of the invention are described in terms of 802.11x standards, it would be understood by a person skilled in the art that the invention could be applied to other wireless local area network technologies, such as (but not limited to) Bluetooth.

What is claimed is:

1. A method of processing a data frame at a node in a wireless Local Area Network, the method comprising:
   receiving a first part of a transmitted frame having a transmission duration indicator, which indicates the expected duration of exchange of information related to the transmitted frame, after the transmission thereof; and
   terminating reception of the said second part of the transmitted frame only when the transmission duration indicator indicates that the said expected duration of transmission is less than a predetermined threshold.

2. The method of claim 1, wherein the first part of the transmitted frame contains a PLCP (Physical Layer Convergence Procedure) header including a frame payload length indicator, and a MAC (Medium Access Control) header that includes the frame destination address along with the transmission duration indicator and an indication of the frame type.

3. The method of claim 2, wherein the node is switchable between first and second node operating modes, the transmitted frame being receivable in the first operating mode but not receivable in the second node operating mode.

4. The method of claim 3 wherein the method further comprises: switching between the first and second modes for a time period dependent upon the frame payload length indicator.

5. The method of claim 4, wherein the method further comprises: switching back to the first mode after the time period dependent upon the frame payload length indicator has expired.

6. The method of claim 4, further comprising, following receipt of the transmitted frame at the node or part thereof, the step of calculating a node idle time gap based upon the length of an expected acknowledgement frame sent from the destination address.

7. The method of claim 6, wherein the node idle time gap is further calculated on the basis of a first time gap length between the transmitted frame and an expected acknowledgement frame sent from the destination address.

8. The method of claim 7, wherein the node idle time gap is further calculated on the basis of a second time gap length between the expected acknowledgement frame sent from the destination address and a further transmitted frame.

9. The method of claim 8, wherein the second time gap is at least as long as the first time gap.

10. The method of claim 8, wherein the node idle time gap is further dependent on the sum of the calculated length of the acknowledgement frame and the first and second time gap lengths.

11. The method of claim 1, wherein the wireless Local Area Network is an 802.11x network.

12. A wireless Local Area Network access node, comprising:
   a receiver adapted to receive a first part of a transmitted frame within the wireless Local Area Network;
   a timer;
   a switching means for switching between first and second modes of the node in dependence upon an output of that timer; and
   a processor means configured to:

(a) detect the frame destination address from the first part of the transmitted frame; and,
   (b) terminate reception of the second part of the frame when it is determined that the frame destination address indicates that the transmitted frame is not intended for that node.

13. A wireless Local Area Network access node according claim 12, wherein the processor is further configured to: calculate the length of an expected acknowledgement frame sent from the destination address; and determine the first and second time gaps.

14. A wireless Local Area Network system including the access node of claim 12.

15. A method of processing a data frame at a node in a wireless Local Area Network, the method comprising:
   receiving a first part of a transmitted frame;
   identifying, within that first part of the transmitted frame, a frame destination address;
   identifying, within the first part of the transmitted frame, a duration field, indicative of an expected duration of exchange of information related to the transmitted frame, after the transmission thereof; and,
   terminating reception of a second part of the transmitted frame when it is determined that the frame destination address indicates that the transmitted frame is not intended for that node and the duration field indicates the duration of exchange of information is less than a predetermined time.

* * * * *